United States Patent Office 3,386,900
Patented June 4, 1968

3,386,900
ELECTROLYTIC PROCESS OF MAKING DIETHYLSTILBESTROL
James Edward Slager, Edwardsburg, Ind., assignor to Miles Laboratories, Inc., Elkhart, Ind., a corporation of Indiana
No Drawing. Filed June 24, 1964, Ser. No. 377,482
10 Claims. (Cl. 204—75)

This invention relates to a process for the production of diethylstilbestrol. More particularly, it relates to the electrolytic reduction of an intermediate used in the production of diethylstilbestrol.

Diethylstilbestrol is a sex hormone employed, for example, in veterinary practice to control lactation and pregnancy in animals. It has previously been prepared by a complex process of reacting anethole hydrobromide with sodamide in liquid ammonia and then heating the resulting compound in the presence of potassium hydroxide for about 18 hours. A suggestion was made in the prior art to simplify this process by dehydrating and rearranging 3,4-bis(p-hydroxyphenyl)-3,4-hexanediol to form 3,3-bis(p-hydroxyphenyl)-4-hexanone, reducing this product with sodium borohydride, for example, to form 3,3-bis(p-hydroxyphenyl)-4-hexanol and then dehydrating and rearranging this product to form diethylstilbestrol. This suggested process still has the disadvantages of requiring an expensive sodium borohydride reducing agent for the intermediate as well as requiring a long reaction time (about 18–22 hours) for the reduction.

It is an object of the present invention to provide an improved process for the production of diethylstilbestrol.

It is another object of the present invention to provide an improved process for the reduction of an intermediate used in the production of diethylstilbestrol.

It is still another object of the present invention to provide an improved process for the reduction of 3,3-bis(p-hydroxyphenyl)-4-hexanone to 3,3-bis(p-hydroxyphenyl)-4-hexanol, such process being relatively inexpensive and having a relatively short reaction time.

In accordance with the present invention, diethylstilbestrol is produced from 3,4-bis(p-hydroxyphenyl)-3,4-hexanediol by a process which comprises converting the 3,4-bis(p-hydroxyphenyl) - 3,4 - hexanediol to 3,3-bis(p-hydroxyphenyl)-4-hexanone, electrolytically reducing the 3,3-bis(p-hydroxyphenyl) - 4 - hexanone to 3,3-bis(p-hydroxyphenyl)-4-hexanol and then converting this material to diethylstilbestrol. More particularly, the process of the present invention comprises producing diethylstilbestrol by dehydrating and rearranging 3,4-bis(p-hydroxyphenyl)-3,4-hexanediol to form 3,3-bis(p-hydroxyphenyl)-4-hexanone, electrolytically reducing the 3,3-bis(p-hydroxyphenyl)-4-hexanone in a catholyte in admixture with a salt selected from the class consisting of tetraalkylammonium salts, tetraalkylphosphonium salts and trialkylsulfonium salts to form 3,3-bis(p-hydroxyphenyl)-4-hexanol, and dehydrating and rearranging the 3,3-bis(p-hydroxyphenyl)-4-hexanol to form diethylstilbestrol.

The principal feature of the present invention resides in the electrolytic reduction of 3,3-bis(p-hydroxyphenyl)-4-hexanone to form 3,3-bis(p-hydroxyphenyl)-4-hexanol by passing an electrical current between a cathode immersed in a catholyte comprising a liquid mixture of 3,3-bis(p-hydroxyphenyl)-4-hexanone and a salt selected from the class consisting of tetraalkylammonium salts, tetraalkylphosphonium salts and trialkylsulfonium salts and an anode immersed in an anolytic comprising an aqueous mineral acid, said catholyte and anolyte being separated by an inert barrier which permits the passage of ions, such as hydrogen and hydroxyl ions, but is impervious to organic materials, such as 3,3-bis(p-hydroxyphenyl)-4-hexanol.

The starting material employed in this process, 3,4-bis(p-hydroxyphenyl)-3,4-hexanediol, is a well known compound and is prepared by the electrolytic reduction of p-hydroxypropiophenone. This 3,4-bis(p-hydroxyphenyl)-3,4-hexanediol is converted to 3,3-bis(p-hydroxyphenyl)-4-hexanone by a well known dehydration and rearrangement reaction. The dehydration and the migration of a p-hydroxyphenyl group is readily accomplished by heating the 3,4-bis(p-hydroxyphenyl)-3,4-hexanediol to reflux in the presence of an inert water-miscible solvent and in the presence of concentrated sulfuric acid catalyst. Exemplary water-miscible solvents which are inert to the starting material and products are methanol, ethanol, isopropanol and the like. The amount of sulfuric acid catalyst is about one weight percent of the weight of the solvent. The solvent is used in an amount sufficient to dissolve all the starting material. Exemplary quantities are 100 g. of 3,4-bis(p-hydroxyphenyl)-3,4-hexanediol and 240–250 ml. of methanol.

The resulting solvent solution of 3,3-bis(p-hydroxyphenyl)-4-hexanone can be employed directly in the electrolytic reduction process for the production of 3,3-bis(p-hydroxyphenyl)-4-hexanol. Alternatively, the 3,3-bis(p-hydroxyphenyl)-4-hexanone can be recovered and subsequently used in the electrolytic reduction process. Recovery is conveniently obtained by adding water to the solvent solution of 3,3-bis(p-hydroxyphenyl)-4-hexanone to form a precipitate of the compound. This precipitate can then be removed by filtration or similar techniques.

The electrolytic reduction of 3,3-bis(p-hydroxyphenyl)-4-hexanone to 3,3-bis(p-hydroxyphenyl)-4-hexanol is a novel technique which has advantages over prior art reduction processes, such as the use of sodium borohydride. The electrolytic process is less expensive and it enables a reduction to be completed in about 2–10 hours as compared with prior art processes requiring up to about 16 hours for reduction. This shorter time also reduces overall manufacturing costs.

The electrolytic reduction is carried out in an electrolytic cell comprising a cathode positioned in a catholyte chamber, an anode positioned in an anolyte chamber, and wherein the catholyte and anolyte chambers are separated by a barrier which permits the passage of ions, such as hydrogen and hydroxyl ions, but which is impervious to organic compounds, such as 3,3-bis(p-hydroxyphenyl)-4-hexanol.

The catholyte solution placed in the catholyte chamber comprises the 3,3 - bis(p-hydroxyphenyl)-4-hexanone to be reduced in admixture with an aqueous solution of a salt selected from the class consisting of tetraalkylammonium salts, tetraalkylphosphonium salts and trialkylsulfonium salts. This catholyte mixture contains a sufficient quantity of the salt to provide desirable conductivity and also preferably to produce a catholyte pH of at least about 7.0. The proper reduction conditions require an alkaline catholyte otherwise hydrogen gas will be evolved during the electrolytic process. If the catholyte is not initially at a pH above 7.0, such condition can be reached by starting the electrolysis and continuing the passage of current until the catholyte becomes alkaline. The catholyte should contain from about 2 to about 20 weight percent of the above salt based on total weight of the salt and water. Preferably, the catholyte contains from about 5 to about 10 weight percent of the salt based on the total weight of the salt and water.

Exemplary salts useful in the catholyte of the present novel process are tetraethylammonium bromide,
tetraethylammonium hydroxide,
bis(tetrametylammonium) sulfate,
tetrapropylammonium nitrate,
bis(dimethyldiethylammonium) carbonate,
tetramethylphosphonium iodide,
tetraethylphosphonium nitrate,
trimethylsulfonium chloride,
triethylsulfonium nitrate and the like. The tetraalkylammonium salts are the preferred materials to use in this process.

The catholyte also preferably contains an inert water-miscible solvent, such as methanol, in order to maintain a high degree of solubility for the 3,3-bis(p-hydroxyphenyl)-4-hexanone which is relatively insoluble in water. When a solvent solution of 3,3-bis(p-hydroxyphenyl)-4-hexanone prepared as described above is employed in the above described electrolytic reduction process, the resulting catholyte will contain the solvent which accompanies the 3,3-bis(p-hydroxyphenyl)-4-hexanone. It is desirable that the solvent and water in the catholyte be present in about equal weight amounts.

The amount of 3,3-bis(p-hydroxyphenyl)-4-hexanone present in the catholyte is not narrowly critical. Since this material is being reduced in the process, it is advantageous to have as much present in the catholyte as possible up to the maximum amount soluble in the aqueous salt solution, also preferably including an inert water-miscible solvent. The quantity of 3,3 - bis(p-hydroxyphenyl)-4-hexanone to be reduced can be placed as a single amount in the catholyte at the beginning of the reduction run, or it can be added in partial amounts as the reduction progresses.

The cathode is preferably mercury, but other materials, such as platinum, can also be used. The anode is preferably lead, but other materials, such as platinum can also be used.

The anolyte solution placed in the anolyte chamber is an aqueous mineral acid. Sulfuric acid is preferred since it does not attack the lead oxide coating on the preferred lead anode material. If another anode material, such as platinum is used, then other acids, such as nitric acid, hydrochloric acid, phosphoric acid and the like, can be used in the anolyte. The acid concentration in the anolyte is not critical.

The barrier employed between the catholyte and anolyte chambers is conveniently prepared from fuse alumina. Such barrier materials having the desired permeability are available commercially. For example, Alundum Type RA84 fused alumina, marketed by the Norton Company, is quite satisfactory.

The electrolytic reduction of 3,3-bis(p-hydroxyphenyl)-4-hexanone is conveniently carried out at a voltage of about 10 to about 15 volts and under a cathode current density of about 0.02 to about 0.1 amp./sq. cm. of cathode area. This reduction can also be carried out at temperatures ranging from the freezing point of the catholyte up to the boiling point of the catholyte. Preferably the electrolytic reduction is carried out at about 30° C. to 60° C.

The 3,3 - bis(p-hydroxyphenyl)-4-hexanone resulting from the electrolytic reduction step is then recovered from the catholyte and further reacted to form diethylstilbestrol. The recovery is accomplished in the following exemplary manner. The solvent, such as methanol, is distilled off. The residue is mixed with an inert water-immiscible solvent, such as diethyl ether, isopropyl ether, ethyl acetate, benzene and the like. The reduced product is soluble in the solvent, and the resulting solvent phase containing the reduced product is conveniently separated from the immiscible water phase. Dehydration and rearrangement to form diethylstilbestrol is accomplished in the following manner. The solvent is stripped off. The residue containing the reduced product is mixed with methanol and a mineral acid, such as hydrochloric acid, and heated to reflux. This dehydrates and rearranges the reduced product to form diethylstilbestrol. The resulting liquid mixture is cooled to about 20° C. or below to solidify diethylstilbestrol. The liquor is reheated to reflux and recooled to produce additional solidified diethylstilbestrol. Diethylstilbestrol is practically insoluble in cold water and is fairly soluble in hot methanol. For recrystallization diethylstilbestrol is dissolved in hot methanol, an equal volume of water is added, and on cooling with agitation the diethylstilbestrol separates as dense crystals which filter readily.

The invention is further described in the following examples.

Example 1

A 600 ml. glass beaker was fitted with an agitator and cooling bath and a ¼-inch thick layer of mercury was placed at the bottom of the beaker to form a cathode. To this beaker were then added 250 ml. water, 6 g. tetraethylammonium bromide and 20 g. tetraethylammonium hydroxide. A 28 g. quantity of 3,3-bis(p-hydroxyphenyl)-4-hexanone dissolved in about 150 ml. methanol was also added to complete the composition of the catholyte. This 3,3-bis(p-hydroxyphenyl)-4-hexanone had previously been prepared by dehydrating and rearranging 3,4-bis(p-hydroxyphenyl)-3,4-hexanediol. The resulting catholyte contained 9.4 weight percent tetraethylammonium salts based on the total weight of salts and water and had a pH over 7.0.

A fused alumina thimble 30 mm. I.D., 40 mm. O.D. and 32 cm. long was placed in the center of the beaker and was partly submerged in the liquid contents. A 10 weight percent aqueous solution of sulfuric acid and a lead anode strip were placed inside the alumina thimble. The catholyte was mechanically agitated. A 10 volt potential was applied between the mercury cathode and the lead strip anode to provide a 2 amp. current. The cathode current density was 0.024 amp./sq. cm. The temperature of the solutions was 47° C. After 2½ hours hydrogen began to evolve from the cathode indicating completion of reduction of 3,3-bis(p-hydroxyphenyl)-4-hexanone to the hexanol. The catholyte was decanted from the mercury cathode. The methanol was distilled from the catholyte under 25–30 mm. Hg vacuum. The residue was extracted with ethyl ether and separated from the water phase. The ether solution was evaporated in the presence of 100 ml. of concentrated hydrochloric acid. When the temperature of the solution got above 50° C., 100 ml. of methanol were added and heating was continued up to 64° C. to distill off methanol. The residue was cooled to 10° C. and a white crystalline solid formed. The solid was filtered and dried in an oven at 50° C. to yield 10 g. of a product having a melting point of 167° C.–175° C. This is in the melting point range of crude diethylstilbestrol.

Example 2

Apparatus similar to that described in Example 1 was used. To a 1-liter beaker were added 500 ml. water, 50 g. tetraethylammonium bromide and 57 g. 3,3-bis(p-hydroxyphenyl)-4-hexanone dissolved in 140 ml. of methanol. This catholyte contained 9.1 weight percent tetraethylammonium bromide based on total weight of salt and water. The 3,3-bis(p-hydroxyphenyl)-4-hexanol had previously been prepared by dehydration and rearrangement of 3,4-bis(p-hydroxyphenyl)-3,4-hexanediol. The electrolytic reduction was carried out at 15 volts, 3 amps. 35° C.–40° C. for 1.75 hours. The cathode current density was 0.036 amp./sq. cm. The catholyte was still acid and hydrogen was evolved at the cathode. A 20 g. quantity of tetraethylammonium hydroxide was added to the catholyte which now contained 12.3 weight percent tetraethylammonium salts based on total weight of salts and water. The catholyte became alkaline and hydrogen evolution was decreased. The electrolytic reduction was continued for 3 more hours at 10 volts, 3 amps. and 40° C. The catholyte was separated from the mercury cathode. The methanol was stripped from the catholyte under vacuum. The residue was extracted with isopropyl ether and the water phase (electrolyte liquor) was separately retained. The ether was stripped off from the ether-extracted phase in the presence of 200 ml. of concentrated hydrochloric acid. When the temperature reached 50° C., about 200 ml. of methanol were added. The resulting mixture was cooled to room temperature overnight and solidified material was removed. The liquor was reheated to reflux (about 64° C.) for 1 hour and then cooled to 5° C. Solidified material was removed. The liquor was reheated to 64° C. for 2 hours and then cooled to 5° C. Solidified material was removed. All the solidified material was collected and dried in an oven at 50° C. for 24 hours. The product yield was 29 g. which was 54 weight percent of the theoretical amount of diethylstilbestrol based on the weight of the starting material.

Example 3

A mixture of 105 g. of 3,4-bis(p-hydroxyphenyl)-3,4-hexanediol, 250 ml. of methanol and 2 ml. of sulfuric acid was heated at reflux for 2 hours to dehydrate and rearrange the 3,4-bis(p-hydroxyphenyl)-3,4-hexanediol to form 3,3-bis(p-hydroxyphenyl)-4-hexanone. This entire mixture was then added to the electrolyte liquor retained from Example 2 above (contains the tetraethylammonium salts in aqueous solution) to form a catholyte. An electrolytic reduction was carried out according to the procedure of the preceding examples. The electrical conditions were 4–5 amps. at 12–14 volts and temperature of 42° C.–53° C. The cathode current density was 0.048–0.06 amp./sq. cm. The total reduction time at a pH above 7.0 was 9.5 hours. However, the reduction was substantially complete within 8 hours. The catholyte was decanted from the mercury cathode. The methanol was stripped off under vacuum. The residue was extracted with isopropyl ether and separated from the water phase which was separately retained (contains the tetraethylammonium salt in aqueous solution). The ether extract was treated in the same manner as described in Example 2 above to yield 58 g. of crude diethylstilbestrol which was 65 weight percent of the theoretical yield.

Example 4

A mixture of 200 g. of 3,4-bis(p-hydroxyphenyl)-3,4-hexanediol, 500 ml. of methanol and 3 ml. sulfuric acid was heated to reflux for 4 hours and cooled overnight to form 3,3-bis(p-hydroxyphenyl)-4-hexanone. One half of the resulting solution was added to the electrolyte liquor retained from Example 3 above to form a catholyte. An electrolytic reduction was carried out according to the procedure of the preceding examples. The electrical conditions were 11 volts and 8 amps. at a temperature of 60° C. The cathode current density was 0.096 amp./sq. cm. The total reduction time at a pH above 7.0 was 11 hours. However, the reduction was substantially complete within 8 hours. The catholyte was decanted from the mercury cathode. The methanol was distilled off under vacuum. The residue was extracted with isopropyl ether after adjusting the pH of the residue to a value of 6 with sulfuric acid. A 100 ml. quantity of water was added and the isopropyl ether was distilled off to 95° C. At this point 200 ml. of isopropanol were added followed by 100 ml. of concentrated sulfuric acid. Refluxing was maintained at 95° C. for 2 hours. The mixture was cooled to 5° C. and the solids removed by filtration. The liquor was reheated to 95° C. for about 1 hour and cooled to 5° C. The solids were removed by filtration. This heating and cooling cycle was repeated for a total of 4 solid collections. The total yield was 95 g. The solids were dissolved in a hot mixture of equal volume amounts of methanol and water. The solution was cooled to 5° C. and the solids removed by filtration. The yield was 72 g. (81 weight percent of theory) of diethylstilbestrol having a melting point of 174° C.–176° C.

The diethylstilbestrol produced by the above described process can be employed in any of the known prior art uses for diethylstilbestrol.

In summary, the present invention relates to an improved process for the production of diethylstilbestrol from 3,4-bis(p-hydroxyphenyl)-3,4-hexanediol wherein the hexanediol is converted to a hexanone which is then electrolytically reduced to a hexanol which is further converted to diethylstilbestrol. The invention especially relates to an electrolytic reduction of 3,3-bis(p-hydroxyphenyl) - 4 - hexanone to 3,3 - bis(p-hydroxyphenyl)-4-hexanol.

What is claimed is:

1. A process for the production of diethylstilbestrol which comprises dehydrating and rearranging 3,4-bis(p-hydroxyphenyl)-3,4-hexanediol to form 3,3-bis(p-hydroxyphenyl)-4-hexanone, electrolytically reducing the 3,3-bis(p-hydroxyphenyl)-4-hexanone in a catholyte in admixture with a salt selected from the class consisting of tetraalkylammonium salts, tetraalkylphosphonium salts and trialkylsulphonium salts to form 3,3-bis(p-hydroxyphenyl)-4-hexanol, and dehydrating and rearranging the 3,3-bis(p-hydroxyphenyl)-4-hexanol to form diethylstilbestrol.

2. A process for the production of diethylstilbestrol which comprises dehydrating and rearranging 3,4-bis(p-hydroxyphenyl)-3,4-hexanediol to form 3,3-bis(p-hydroxyphenyl)-4-hexanone, electrolytically reducing the 3,3 - bis(p-hydroxyphenyl)-4-hexanone to 3,3-bis(p-hydroxyphenyl)-4-hexanol by passing an electrical current between a cathode immersed in a catholyte comprising a mixture of 3,3-bis(p-hydroxyphenyl)-4-hexanone and an aqueous solution of a salt selected from the class consisting of tetraalkylammonium salts, tetraalkylphosphonium salts and trialkylsulphonium salts and an anode immersed in an anolyte comprising an aqueous mineral acid, said catholyte and anolyte being separated by a barrier which permits the passage of ions but which is impervious to organic materials, and dehydrating and rearranging the 3,3-bis(p-hydroxyphenyl)-4-hexanol to form diethylstilbestrol.

3. A process according to claim 2 wherein the catholyte also contains an inert water-miscible solvent.

4. A process according to claim 3 wherein the solvent is methanol.

5. A process according to claim 2 wherein the catholyte contains from about 2 to about 20 weight percent of the salt based on the total weight of the salt and water.

6. A process according to claim 2 wherein the catholyte contains from about 5 to about 10 weight percent of the salt based on the total weight of the salt and water.

7. A process according to claim 2 wherein the barrier between the catholyte and anolyte is formed from fused alumina.

8. A process according to claim 2 wherein the anolyte is aqueous sulfuric acid.

9. A process according to claim 2 wherein the salt contained in the catholyte is a tetraalkylammonium salt.

10. A process for the production of diethylstilbestrol which comprises dehydrating and rearranging 3,4-bis(p-hydroxyphenyl)-3,4-hexanediol to form 3,3-bis(p-hydroxyphenyl)-4-hexanone, electrolytically reducing the 3,3 - bis(p-hydroxyphenyl)-4-hexanone to 3,3-bis(p-hydroxyphenyl)-4-hexanol by passing an electrical current between a cathode immersed in a catholyte comprising a mixture of 3,3-bis(p-hydroxyphenyl)-4-hexanone, methanol, water and a tetraalkylammonium salt, said salt being present in an amount from about 2 to about 20 weight percent based on the total weight of the salt and water, and an anode immersed in an anolyte comprising aqueous sulfuric acid, said catholyte and anolyte being separated by a barrier formed from fused alumina which permits the passage of ions but which is impervious to organic materials, and dehydrating and rearranging the 3,3-bis(p-hydroxyphenyl)-4-hexanol to diethylstilbestrol.

References Cited

UNITED STATES PATENTS

| | | | |
|---|---|---|---|
| 2,252,696 | 8/1941 | Braker et al. | 204—619 |
| 2,385,853 | 10/1945 | Turnbull | 204—619 |
| 2,393,570 | 1/1946 | Salmon et al. | 204—619 |
| 3,200,053 | 10/1965 | Yost | 204—75 |

HOWARD S. WILLIAMS, *Primary Examiner.*

H. M. FLOURNOY, *Assistant Examiner.*